(12) United States Patent
Mitic

(10) Patent No.: US 9,025,028 B2
(45) Date of Patent: May 5, 2015

(54) DEVICE AND METHOD FOR DETECTING VEHICLE LICENSE PLATES

(75) Inventor: Sladjan Mitic, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 366 days.

(21) Appl. No.: 13/593,126

(22) Filed: Aug. 23, 2012

(65) Prior Publication Data

US 2013/0050493 A1 Feb. 28, 2013

(30) Foreign Application Priority Data

Aug. 30, 2011 (EP) ..................................... 11450108

(51) Int. Cl.
| | |
|---|---|
| H04N 7/18 | (2006.01) |
| G06F 13/00 | (2006.01) |
| G08G 1/017 | (2006.01) |
| G06K 9/32 | (2006.01) |
| H04N 5/345 | (2011.01) |
| G06K 9/20 | (2006.01) |
| H04N 5/232 | (2006.01) |

(52) U.S. Cl.
CPC .............. *G08G 1/0175* (2013.01); *G06K 9/325* (2013.01); *H04N 5/23245* (2013.01); *H04N 5/3454* (2013.01); *G06K 9/2054* (2013.01)

(58) Field of Classification Search
USPC ........... 348/148, 149; 340/937; 382/105, 104, 382/182, 176
See application file for complete search history.

(56) References Cited

U.S. PATENT DOCUMENTS

| | | | | |
|---|---|---|---|---|
| 5,416,711 A | * | 5/1995 | Gran et al. ..................... | 701/117 |
| 5,591,972 A | * | 1/1997 | Noble et al. ................... | 250/330 |
| 5,948,038 A | * | 9/1999 | Daly et al. ..................... | 701/117 |
| 6,281,928 B1 | * | 8/2001 | Umezaki et al. .............. | 348/148 |
| 6,650,765 B1 | * | 11/2003 | Alves ............................. | 382/105 |
| RE38,626 E | * | 10/2004 | Kielland ........................ | 340/937 |
| 7,504,965 B1 | * | 3/2009 | Windover et al. ............. | 340/937 |
| 8,630,497 B2 | * | 1/2014 | Badawy et al. ............... | 382/225 |
| 2002/0180759 A1 | * | 12/2002 | Park et al. ...................... | 345/629 |
| 2004/0252193 A1 | * | 12/2004 | Higgins ......................... | 348/149 |
| 2005/0029347 A1 | * | 2/2005 | Noble et al. ................... | 235/384 |
| 2006/0056658 A1 | * | 3/2006 | Kavner .......................... | 382/105 |

(Continued)

FOREIGN PATENT DOCUMENTS

| | | |
|---|---|---|
| WO | WO 2008/057285 A2 | 5/2008 |
| WO | WO 2008/057285 A3 | 5/2008 |

(Continued)

OTHER PUBLICATIONS

Extended European Search Report for corresponding European Patent Application No. 11 450 108.3, dated Mar. 14, 2012, 10pp.

(Continued)

*Primary Examiner* — Victor Kostak
(74) *Attorney, Agent, or Firm* — Fiala & Weaver P.L.L.C.

(57) ABSTRACT

A system and method for detection of vehicle license plates including a video camera that has a first operating mode in which it generates a first image sequence of a small, strip-shaped section of its optical camera image at a high frame rate, and a second operating mode in which a second image sequence of its entire optical camera image is generated at a lower frame rate. In the first operating mode, at the time of the detection of a license plate in the first image sequence, the video camera is switched to the second operating mode to generate an image, which contains the license plate in or near the mentioned section.

16 Claims, 3 Drawing Sheets

(56) References Cited

U.S. PATENT DOCUMENTS

| | | | |
|---|---|---|---|
| 2006/0120602 A1* | 6/2006 | Tang et al. | 382/176 |
| 2006/0269105 A1* | 11/2006 | Langlinais | 382/105 |
| 2007/0236582 A1* | 10/2007 | Romano et al. | 348/231.99 |
| 2008/0129844 A1* | 6/2008 | Cusack et al. | 348/241 |
| 2008/0131001 A1* | 6/2008 | Hofman et al. | 382/182 |
| 2008/0158365 A1 | 7/2008 | Reuter | |
| 2008/0166018 A1* | 7/2008 | Li et al. | 382/105 |
| 2008/0285804 A1* | 11/2008 | Sefton | 382/105 |
| 2009/0160976 A1 | 6/2009 | Chen et al. | |
| 2009/0207046 A1* | 8/2009 | Arrighetti | 340/937 |
| 2010/0172543 A1* | 7/2010 | Winkler | 382/104 |
| 2011/0187854 A1* | 8/2011 | Chung | 348/135 |
| 2011/0228085 A1* | 9/2011 | Hofman | 348/143 |
| 2012/0281115 A1* | 11/2012 | Kouncar | 348/231.99 |
| 2013/0162817 A1* | 6/2013 | Bernal | 348/143 |
| 2013/0236063 A1* | 9/2013 | Shin et al. | 382/105 |

FOREIGN PATENT DOCUMENTS

| | | |
|---|---|---|
| WO | WO 2008/136007 A2 | 11/2008 |
| WO | WO 2008/136007 A3 | 11/2008 |

OTHER PUBLICATIONS

Arth, Clemens, et al.; "Real-Time License Plate Recognition on an Embedded DSP-Platform"; Institute for Computer Graphics and Vision; 8pp.

* cited by examiner

DEVICE AND METHOD FOR DETECTING VEHICLE LICENSE PLATES

CROSS-REFERENCE TO RELATED APPLICATION(S)

This application claims priority to European Patent Application No. 11 450 108.3, filed on Aug. 30, 2011, the entire contents of which are hereby expressly incorporated by reference.

FIELD OF THE INVENTION

The present invention pertains to a device for detecting vehicle license plates.

BACKGROUND

Detecting vehicle license plates in a camera field or in an image sequence (video stream) of a video camera is a common task in traffic monitoring applications and also a preliminary step for automatic license plate reading methods using optical character recognition (OCR). To obtain reliable recorded images that can be read well by OCR, the precise image in the image sequence to be detected is the image from which, the vehicle license plate can be read completely and well. Moreover, for OCR applications, it is advantageous if the vehicle license plate is located in the most possible stable position in the image. For this purpose, conventional license plate detection systems use "virtual trigger lines" that are defined in the optical camera image and when the license plate of a passing vehicle is detected at this trigger line, the next image(s) of the image sequence are used as a detection result for further OCR processing.

It is known to carry out the detection at the virtual trigger lines by uncoupling a light line from the optical camera image via glass fiber guides onto a separate detector line, or by real time image processing methods performed directly on the video stream. The first variant is mechanically/optically complicated, and the second variant is complicated in terms of computation of resources. Moreover, due to the limited frame rate of the usual video streams, for example, 25-50 frames per second (fps), the second variant leads to "position jitter" of the vehicle license plate in the image view selected as the detection result. Since the vehicles move over a road section and thus over the optical camera image at different speeds, they come to be located in the images of the image sequence in different positions relative to the virtual trigger line depending on their speed, which makes evidence and/or OCR evaluations of the resulting image more difficult.

SUMMARY

The present invention overcomes the disadvantages of the known detection systems and provides devices or methods for license plate detection that achieve high detection accuracy and thus reduce position jitter with minimum effort.

In some embodiments, the present invention is a device for detecting vehicle license plates including a video camera configured to aim on a street section with passing vehicles including license plates to record an optical camera image and convert said camera image to an electronic image sequence. The video camera has a first operating mode in which the video camera is configured to generate a first image sequence of a small strip-shaped section of the optical camera image at a first frame rate, and a second operating mode in which the video camera is configured to generate a second image sequence of the entire optical camera image at a second frame rate, the first frame rate being higher than the second frame rate. Moreover, the video camera is configured by a control signal to switch between the first and the second operating modes. Additionally, a detector unit is coupled to the video camera, wherein upon detection of at least a portion of a license plate in the first image sequence, the detector unit is configured to send the control signal to the video camera, so that the video camera generates at least one electronic image which contains the license plate in or near said strip-shaped section, in the second image sequence.

In some embodiments, the present invention is a method for detecting vehicle license plates including electronically scanning a strip-shaped section of the optical camera image line-by-line for the generation of an electronic scanning signal, the electronic scanning signal being checked continuously for occurrence of a signal indicating a license plate; and when said signal is detected, electronically scanning the entire optical camera image line-by-line and for at least one-time to generate an electronic scanning image of the entire optical camera image, which contains the license plate in or near the mentioned section.

In some embodiments, the exposure parameters of the video camera are set in the second operating mode depending on the reflectivity of the license plate portion detected in the first image sequence, so that the system and the method are self adaptive.

BRIEF DESCRIPTION OF THE DRAWINGS

Additional characteristics and advantages of the invention result from the subsequent description of a preferred embodiment example in reference to the accompanying drawings, in which.

DETAILED DESCRIPTION

Figure 1:
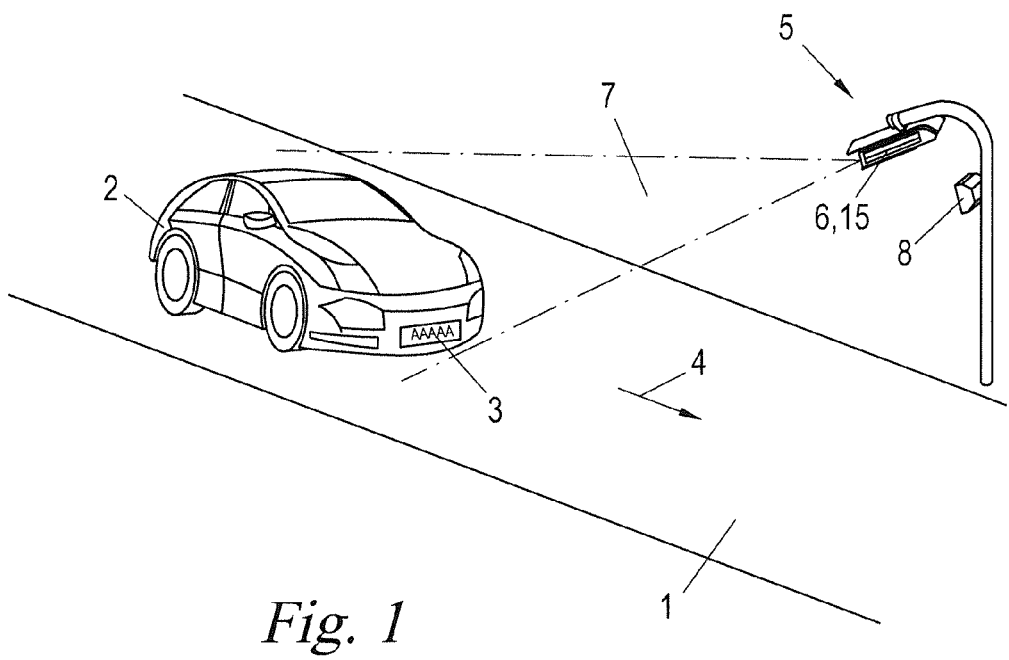
FIG. 1 shows a device for detecting vehicle license plates in an example of a road section in a simplified perspective view, according to some embodiments of the present invention.

The present invention pertains to a device for detecting vehicle license plates that includes a video camera that can be aimed on a road section with passing vehicles with license plates, in order to record an optical camera image, which the camera converts to an electronic image sequence. The invention further pertains to a method for detecting a vehicle license plate in the optical camera image of a traffic monitoring camera that is aimed on a road section.

The present invention is directed to a novel approach of using a video camera that can be switched between two different scan modes, in particular a first mode in which a small, strip-shaped image area is scanned as a "virtual trigger line" at a high frame rate, until a license plate is detected therein. The high frame rate does not necessarily require an increase in the scanning rate. Instead, it may already result from the small width of the section and a second mode that is triggered at the time of detection of the license plate in the first mode, to prepare a larger image in which the license plate comes to be located in a very exact position, due to the previous detection at higher frame rate. The result is a precise detection with low position jitter in a cost effective manner. Accordingly, expensive glass fiber optic system for uncoupling out image portions or high computing power for real time image processing of the entire image is not required. The invention can be carried out with conventional industry standard video cameras, which can be switched between different recording and scanning areas ("areas of interest," AOI).

In principle, it is conceivable that the video camera scans the images of the image sequences not line by line, but according to another pattern or even in parallel pixel processing. In some embodiments, the video camera scans the image of the first and of the second image sequence line by line, where the strip-shaped section lies parallel to the scan lines. A consistent scanning rate in both operating modes is sufficient here to achieve a high frame rate and thus a high temporal resolution of the license plate detection, using only the small number of scan lines in the first image mode.

A reliable license plate detection can be achieved by having the signal to be detected, which indicates a license plate, extend over several consecutive scan lines of the mentioned strip-shaped section. In a first operating mode, the video camera scanning signal as a result needs to be compared only with the correspondingly long reference signal to reliably detect a license plate.

The signal to be detected may be a sequence of bursts, the length of which in each case corresponds to the width of a license plate to be detected, which also makes it possible to selectively detect different types of license plates.

By using two different operating modes of one and the same video camera, the image acquisitions in the two modes can also be adapted in particular to their respective purpose. Thus, in the first operating mode, the road section can be illuminated differently with an appropriately controlled light source than in the second operating mode, preferably more strongly and/or in a different wavelength range, which facilitates the detection of a license plate in the first operating mode. For example, the road section can be illuminated in the first operating mode with a strong infrared emitter, which results in a high contrast of license plates in a camera image that is sensitive to the infrared range. The video camera can also be operated using different operating parameter sets in the two operating modes, preferably with different exposure parameters such as shutter speed, gain and/or gamma correction, in order, on the one hand, to increase the contrast for the license plate detection in the first operating mode, and on the other hand, to record the license plate (and the vehicle) in the second operating mode in such a manner that the subsequent evidence or OCR evaluation is particularly easy or unlikely to fail.

FIG. 1 shows a device for detecting vehicle license plates in an example of a road section in a simplified perspective view, according to some embodiments of the present invention. A road section 1 on which the vehicles 2 with license plates 3 moves in a travel direction 4, is shown. A device 5 with a video camera 6 records a film or video stream, i.e., a sequence P of individual images $P_1$, $P_2$, $P_i$ in general (see FIG. 4) of its field of view on the road section 1, and delivers the image sequence P to an output CL for monitoring or recording purposes, for example. In the present description, the optical camera image 7 of the video camera 6 denotes the field of view, represented by its optical system on its internal image sensor, on the road section 1, i.e., before it is subdivided or scanned by the shutter or scanning devices of the video camera 6 into temporally consecutive individual images $P_i$.

For the illumination of the road section 1 with the passing vehicles 2, the device 5 further comprises a light source 8, for example, an infrared emitter and/or an emitter of visible light, preferably with controllable intensity, illumination area and/or wavelength. The light source 8 may include several single light sources controlled individually, or in a group.

Figure 2:
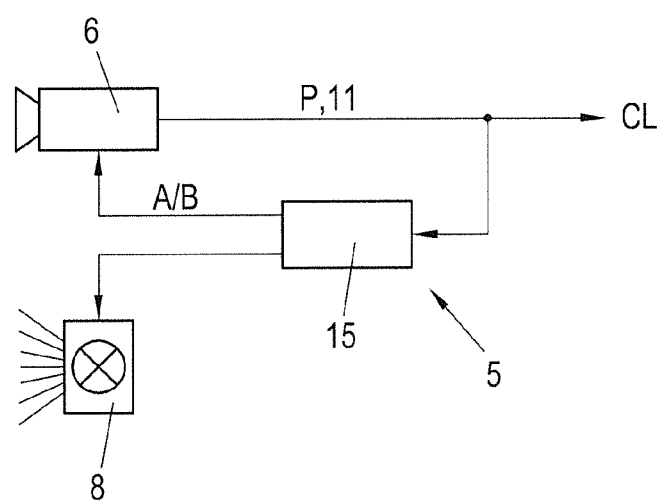
FIG. 2 shows a block diagram of the device in FIG. 1.
Figure 3:
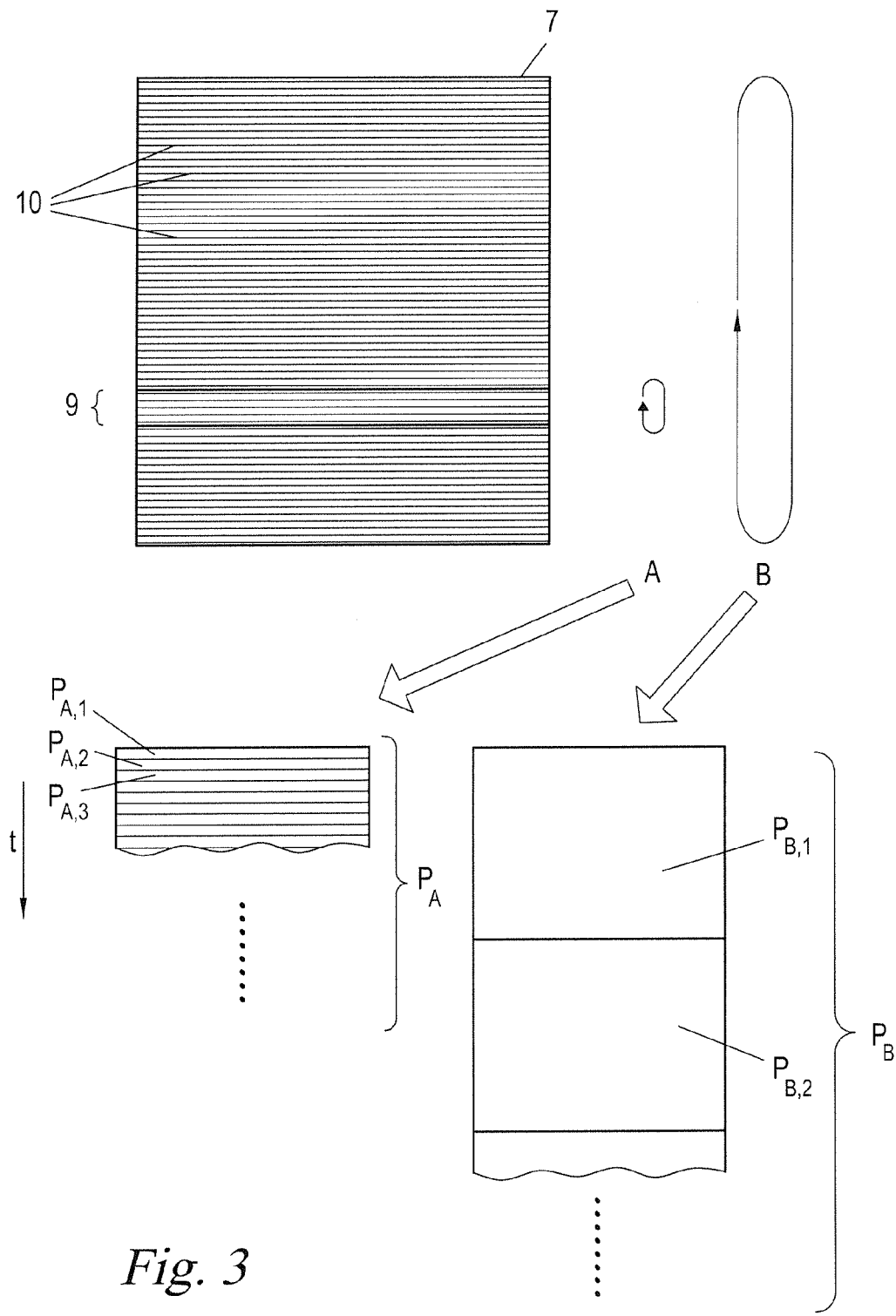
FIG. 3 shows an exemplary scanning scheme in optical camera images, according to some embodiments of the present invention.

Referring to FIGS. 2 and 3, the video camera 6 has two different operating modes A and B, in which it produces image sequences P at a different frame rate, measured in frames per second (fps).

In a first operating mode A, the camera 6 generates a first image sequence $P_A$, which includes a sequence $P_{A,1}$, $P_{A,2}$, etc., of small, strip-shaped sections 9 of its optical camera image 7, which follow each other sequentially at a high frame rate, for example, in the range of 100-5000 fps.

In a second ("normal") operating mode B, the camera 6 generates a second image sequence $P_B$ of individual images $P_{B,1}$, $P_{B,2}$, etc., of its entire (or at least a large portion of the) optical camera image 7 at a "normal" frame rate of, for example, 20-50 fps.

In the case of video cameras 6, which scan their optical camera image line-by-line, the two operating modes A and B can be defined simply by defining the number of scan lines 10, which were swept over in the respective operating modes A and B. If the video camera 6 uses, for example, 1024 horizontal scan lines 10 in the "normal" operating mode B at 25 fps, i.e., each image $P_{B,i}$ is swept over and resolved in 1/25s with 1024 piece scan lines 10. Accordingly, a substantially higher (theoretically up to 1024/16 times higher) frame rate can be achieved, while maintaining the same scan rate and using only 16 piece scan lines 10 in operating mode A.

Using CCD image converters that are readily available and conventionally used in traffic monitoring cameras, it is possible to achieve in this manner frame rates of, for example, 75 fps using eight scan lines 10 in operating mode A, and, with the CMOS converters available today and used in traffic monitoring cameras, more than 4000 fps with 16 piece scan lines 10 in operating mode A.

In some embodiments, video cameras 6 may be conventional industry standard video cameras. With conventional industry standard video cameras 6, the selection of the scan lines 10 and thus the operating mode A or B can be set using a camera interface in accordance with the CameraLink standard by appropriate control commands on the serial interface of the CameraLink interface. In some embodiments, freely configurable control lines of the CameraLink standard, such as the CC1, CC2, CC3 or CC4 control lines, are programmed and used for the conversion between the two operating modes A and B.

Figure 4:
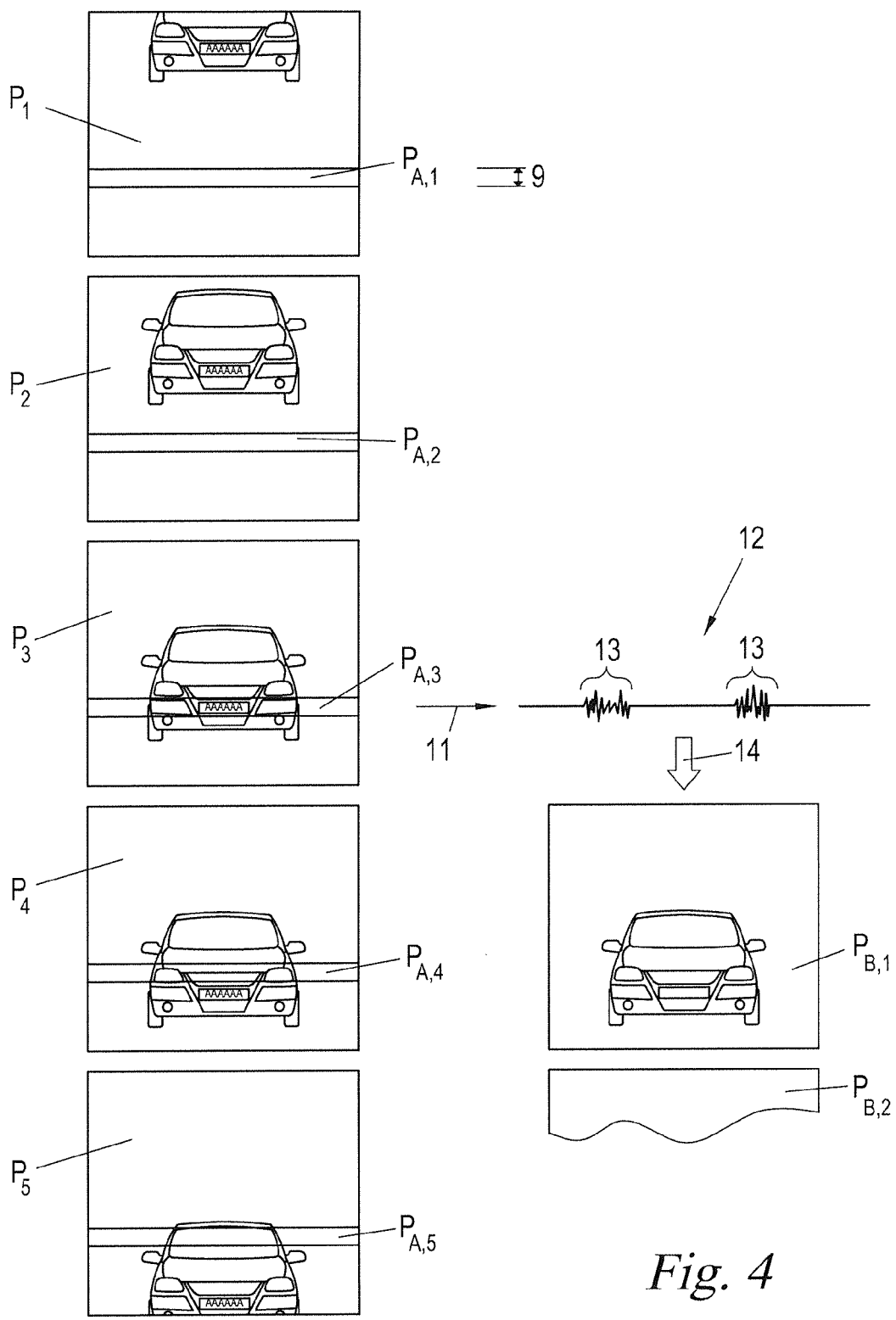
FIG. 4 shows a sequence diagram on the basis of a sequence of camera images and signals occurring therein, according to some embodiments of the present invention.

Now, on the basis of the explained operating modes A and B, the method for license plate detection is explained in greater detail in reference to FIGS. 3 and 4. At the beginning and in its "normal" detection mode, the camera 6 is in operating mode A in which it continuously resolves only a few scan lines 10 in the small, strip-shaped section 9 of its entire optical camera image 7, as first image sequence $P_A$ of small images $P_{A,1}$, $P_{A,2}$, etc. The section 9 represents a "virtual trigger line" for the detection of a license plate 3, when the latter "travels through" the road section 1 and thus the optical camera image 7.

In the third image $P_{A,3}$ shown in FIG. 4 of the first image sequence $P_A$, the license plate 3 is entirely in section 9 and can be detected by monitoring the scanning signal 11 at the output CL of the camera 6 for the occurrence of a signal 12 representing such a license plate 3. In particular, such a signal 12 can be the occurrence of a high brightness or luminance in the scanning signal 11, because license plates are particularly strongly reflective, especially if they are additionally illuminated by a light source 8. When section 9 comprises, for example, four scan lines 10, the entire scanning signal of an image $P_{A,i}$ in operating mode A, in the case of a line-by-line scanning camera 6, consists of four consecutive scan lines. A license plate 3 in section 9 then manifests itself in four consecutive bursts 13 in the scanning signal 11, when it takes up the entire section 9. In particular one burst 13 per scan line 10. Thus, the signal 12 to be detected may extend over several, or all the scan lines 10 of a section 9 or image $P_{A,i}$.

The length of a burst 13 here corresponds approximately to the width of the license plate 3, taking into consideration the geometric distortion of the field of view of the camera 6. Thus, if the length of the bursts 13 is monitored as well and evaluated, different types of vehicle license plates 3 can be distinguished on the basis of their different widths. Moreover, in this manner, vehicle lights can be excluded as possible trigger sources.

When in operating mode A, in section 9, a vehicle license plate 3 is detected on the basis of the occurrence of a characteristic signal 12 in the scanning signal 11, a switch to operating mode B occurs (arrow 14). The evaluation of the scanning signal 11 for the occurrence of the characteristic signal 12 or of the bursts 13 can occur, for example, in a detector device 15 connected to the video camera 6 of the device 5. The detector device 15 sends a corresponding control signal A/B for switching operating modes to the camera 6 (see FIG. 2). The detector device 15 can be integrated directly in the housing of the video camera 6, for example, as shown in FIG. 1. Moreover, the detector device 15 may be implemented by a hardware or software component, which is integrated in the hardware of the video camera, or its function may be performed by a processor.

In the subsequent operating mode B, at least one image $P_{B,i}$ of the second image sequence $P_B$ is then generated. The second image sequence now sweeps over the entire field of view or over the entire optical camera image 7 (or at least a large portion thereof), in particular, with the "full" number of scan lines 10 in operating mode B. The image(s) $P_{B,i}$ generated in operating mode B can subsequently be used as evidence or for OCR reading of the vehicle license plate 3. Due to the high frame rate in the previous detection operating mode A, it is ensured that the vehicle license plate 3 in or near the section 9 has been detected, and is thus located in the image $P_{B,i}$ in a largely constant position in or near the "virtual trigger line" of the section 9. This simplifies the subsequent evaluation of the resulting recorded images $P_{B,i}$.

In the two operating modes A and B, the camera 6 and/or the light source 8 can be operated and controlled using different parameter sets, depending on the desired application. In operating mode A, a higher contrast for the license plate detection is desired, and in operating mode B, good image quality and sharpness in general are required for evidence photos and OCR evaluations. Accordingly, for example, the shutter speed, digital and/or analog amplification (gain), gamma corrections, etc., of the camera 6, i.e., their optical and/or electronic operating parameters, are controlled differently in operating modes A and B, and utilized accordingly in the case of a switchover. Moreover, the light source 8 can be controlled accordingly in terms of light intensity, illumination angle, light color (wavelength), etc. The detector device 15 can also be programmed so that it controls, on the basis of the scanning signal 11 occurring in operating mode A, or of the properties of the bursts 13 detected therein, the operating parameters of the camera 6 and/or the light source 8 in operating mode B in such a manner that the operating parameters in operating mode B are dependent on the measurement and detection values in operating mode A.

After one or more images $P_{B,i}$ of the second image sequence $P_B$ have been produced in operating mode B, the device 5 or the process returns to operating mode A. Operating mode B is accessed only temporarily, in the simplest case, only for a single (the first) image $P_{B,1}$ in operating mode B. It is therefore understandable that the frame rate in the second operating mode B, when the latter is used only for the production of a single image $P_{B,1}$, is defined as the reciprocal of the duration of the scanning of all the scan lines 10 of this image $P_{B,i}$ in operating mode B.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A device for detecting vehicle license plates comprising:
   a video camera configured to aim on a street section with passing vehicles including license plates to record an optical camera image and convert said camera image to an electronic image sequence,
   wherein the video camera has a first operating mode in which the video camera is configured to generate a first image sequence of a strip-shaped section of the optical camera image at a first frame rate, the strip-shaped section being smaller than the entire optical camera image, and a second operating mode in which the video camera is configured to generate a second image sequence of the entire optical camera image at a second frame rate, the first frame rate being higher than the second frame rate, and wherein
   the video camera is configured by a control signal to switch to either the first or the second operating mode; and
   a detector unit coupled to the video camera, wherein the detector unit is configured to detect at least a portion of a license plate in the first image sequence of the first operating mode, and upon detection, to send the control signal to the video camera to trigger the video camera so that it generates at least one electronic image which contains the license plate in or near said strip-shaped section in the second image sequence of the second operating mode.

2. The device according to claim 1, wherein the video camera is configured to scan the images of the first and of the second image sequences line by line, and wherein the strip-shaped section lies parallel to the scan lines.

3. The device according to claim 1, further comprising at least one light source which is aimed on the street section to illuminate the street section differently in the first operating mode than in the second operating mode of the video camera.

4. The device according to claim 3, wherein the at least one light source illuminates the street section more strongly or in a different wavelength range in the first operating mode than in the second operating mode.

5. The device according to claim 1, wherein the video camera has different exposure parameters in the first operating mode than in the second operating mode.

6. The device according to claim 5, wherein the video camera has a different shutter speed, gain, or gamma correction in the first operating mode than in the second operating mode.

7. The device according to claim 5, wherein, in the second operating mode, the exposure parameters of the video camera are set depending on the reflectivity of the license plate portion detected in the first image sequence.

8. The device according to claim 1, wherein the video camera is a CMOS or CCD camera.

9. A method for detecting a vehicle license plate in an optical camera image of a traffic monitoring camera that is aimed on a street section, the method comprising:
- electronically scanning a strip-shaped section of the optical camera image line by line for the generation of an electronic scanning signal while not scanning the entire optical camera image, the electronic scanning signal being checked continuously for occurrence of a signal indicating a license plate; and
- when said signal indicating a license plate is detected in the electronic scanning signal of the strip-shaped section of the optical camera image, electronically scanning the entire optical camera image line-by-line and for at least one-time to generate an electronic scanning image of the entire optical camera image, which contains the license plate in or near the street section.

10. The method according to claim 9, wherein said signal extends over several successive scan lines of the entire strip-shaped section.

11. The method according to claim 10, wherein said signal is a sequence of bursts, a length of which corresponds to a width of a vehicle license plate to be detected.

12. The method according to claim 9, wherein when electronically scanning the strip-shaped section, the street section is illuminated differently than when electronically scanning the entire optical camera image.

13. The method according to claim 12, wherein when electronically scanning the strip-shaped section, the street section is illuminated more strongly or in a different wavelength range than when electronically scanning the entire optical camera image.

14. The method according claim 9, wherein when electronically scanning the strip-shaped section, the camera is operated with different exposure parameters than when electronically scanning the entire optical camera image.

15. The method according claim 14, wherein when electronically scanning the strip-shaped section, the camera is operated with a different shutter speed, gain or gamma correction than when electronically scanning the entire optical camera image.

16. The method according to claim 14, wherein the exposure parameters of the camera when electronically scanning the strip-shaped section are set depending on said detected signal.

* * * * *

UNITED STATES PATENT AND TRADEMARK OFFICE
CERTIFICATE OF CORRECTION

| | |
|---|---|
| PATENT NO. | : 9,025,028 B2 |
| APPLICATION NO. | : 13/593126 |
| DATED | : May 5, 2015 |
| INVENTOR(S) | : Sladjan Mitic |

It is certified that error appears in the above-identified patent and that said Letters Patent is hereby corrected as shown below:

IN THE CLAIMS

In column 8, line 10, in Claim 14, after "according" insert -- to --, therefor.

In column 8, line 14, in Claim 15, after "according" insert -- to --, therefor.

Signed and Sealed this
Sixth Day of October, 2015

Michelle K. Lee
*Director of the United States Patent and Trademark Office*